US009030056B2

(12) United States Patent
Thomsen et al.

(10) Patent No.: US 9,030,056 B2
(45) Date of Patent: May 12, 2015

(54) HIGH-FREQUENCY (HF) VOLTAGE SUPPLY SYSTEM AND METHOD FOR SUPPLYING A MULTIPOLE MASS SPECTROMETER WITH THE HF AC VOLTAGE USED TO GENERATE A MULTIPOLE FIELD

(75) Inventors: Klaus Thomsen, Glinde (DE); Rainer Kappelt, Bremen (DE); Rolf Reinermann, Bremen (DE)

(73) Assignee: InProcess Instruments GmbH, Bremen (DE)

( * ) Notice: Subject to any disclaimer, the term of this patent is extended or adjusted under 35 U.S.C. 154(b) by 535 days.

(21) Appl. No.: 13/519,723

(22) PCT Filed: Jan. 12, 2011

(86) PCT No.: PCT/EP2011/050362
§ 371 (c)(1),
(2), (4) Date: Jun. 28, 2012

(87) PCT Pub. No.: WO2011/086108
PCT Pub. Date: Jul. 21, 2011

(65) Prior Publication Data
US 2012/0286585 A1 Nov. 15, 2012

(30) Foreign Application Priority Data
Jan. 13, 2010 (DE) .................... 10 2010 004 649 U

(51) Int. Cl.
*H02M 5/10* (2006.01)
*H01J 49/02* (2006.01)
*G01R 1/20* (2006.01)
*H02M 7/48* (2006.01)
(52) U.S. Cl.
CPC ............... *H02M 5/10* (2013.01); *H01J 49/022* (2013.01); *H02M 2007/4815* (2013.01); *Y02B 70/1441* (2013.01)

(58) Field of Classification Search
USPC ........................................................ 307/154
See application file for complete search history.

(56) References Cited

U.S. PATENT DOCUMENTS

| 5,354,988 A | 10/1994 | Jullien |
| 2001/0023923 A1 | 9/2001 | Chutjian et al. |
| 2009/0294657 A1 | 12/2009 | Rafferty |

FOREIGN PATENT DOCUMENTS

| DE | 42 42 766 | 6/1994 |
| JP | 2002-033072 | 1/2002 |

OTHER PUBLICATIONS

International Search Report of PCT/EP2011/050362, May 11, 2011.

*Primary Examiner* — Robert Deberadinis
(74) *Attorney, Agent, or Firm* — Collard & Roe, P.C.

(57) ABSTRACT

A radio-frequency (RF) voltage supply system for supplying a multipole mass spectrometer, in particular a quadrupole mass spectrometer, with the alternating RF voltage used to generate a multipole field, in a secondary circuit excited by means of a primary circuit. The RF voltage supply system has an RF voltage measuring device, by means of which the alternating RF voltage in the secondary circuit is sampled, and a digital measurement value that is dependent on the alternating RF voltage is determined. The RF voltage supply system also has a computing device, by means of which a digital alternating voltage amplitude setting value is determined, taking the measurement value into account. There is also an RF voltage generator, by means of which the alternating RF voltage can be made available with an alternating RF voltage amplitude that is set depending on the alternating voltage amplitude setting value.

12 Claims, 2 Drawing Sheets

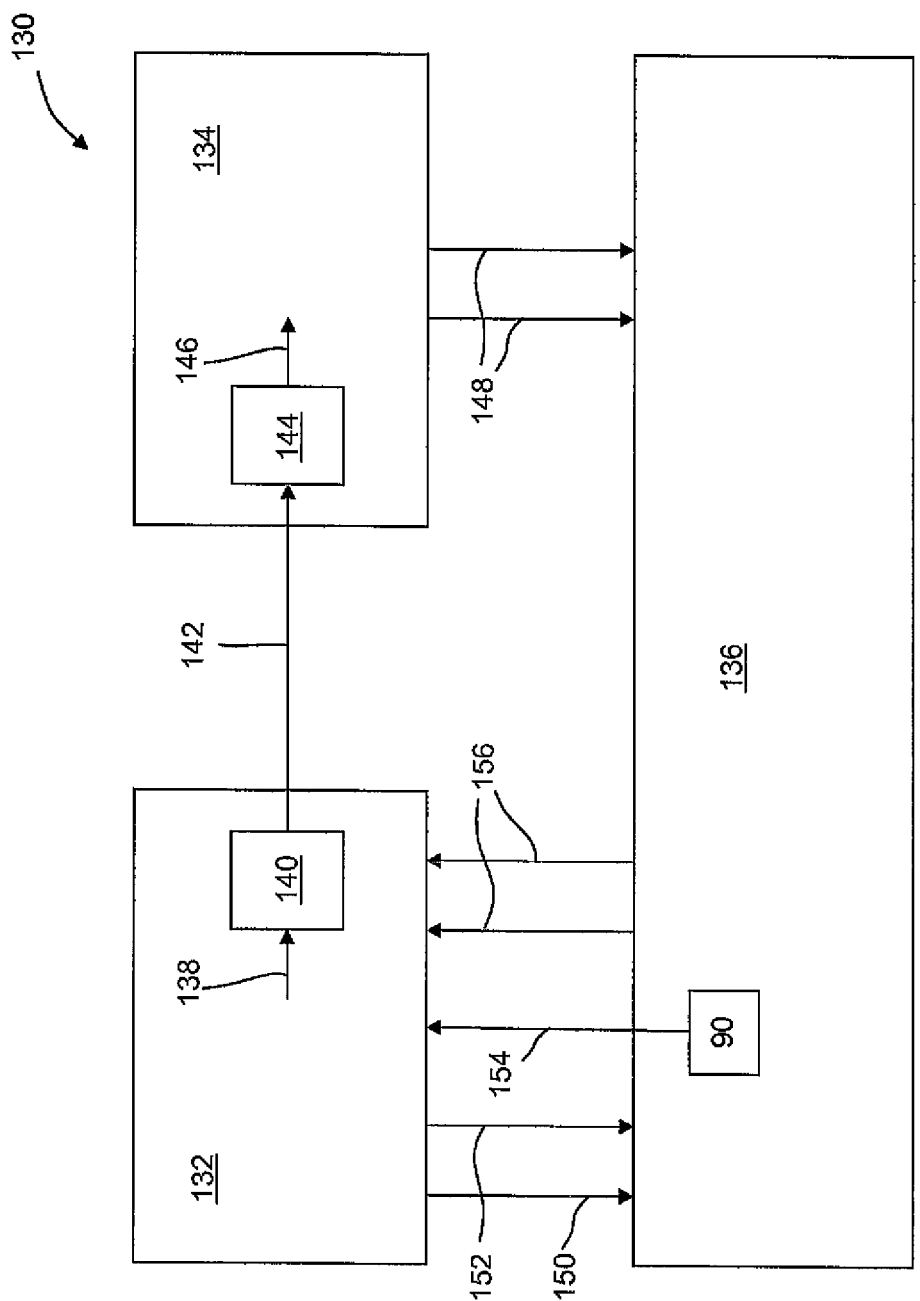

Figure 1:
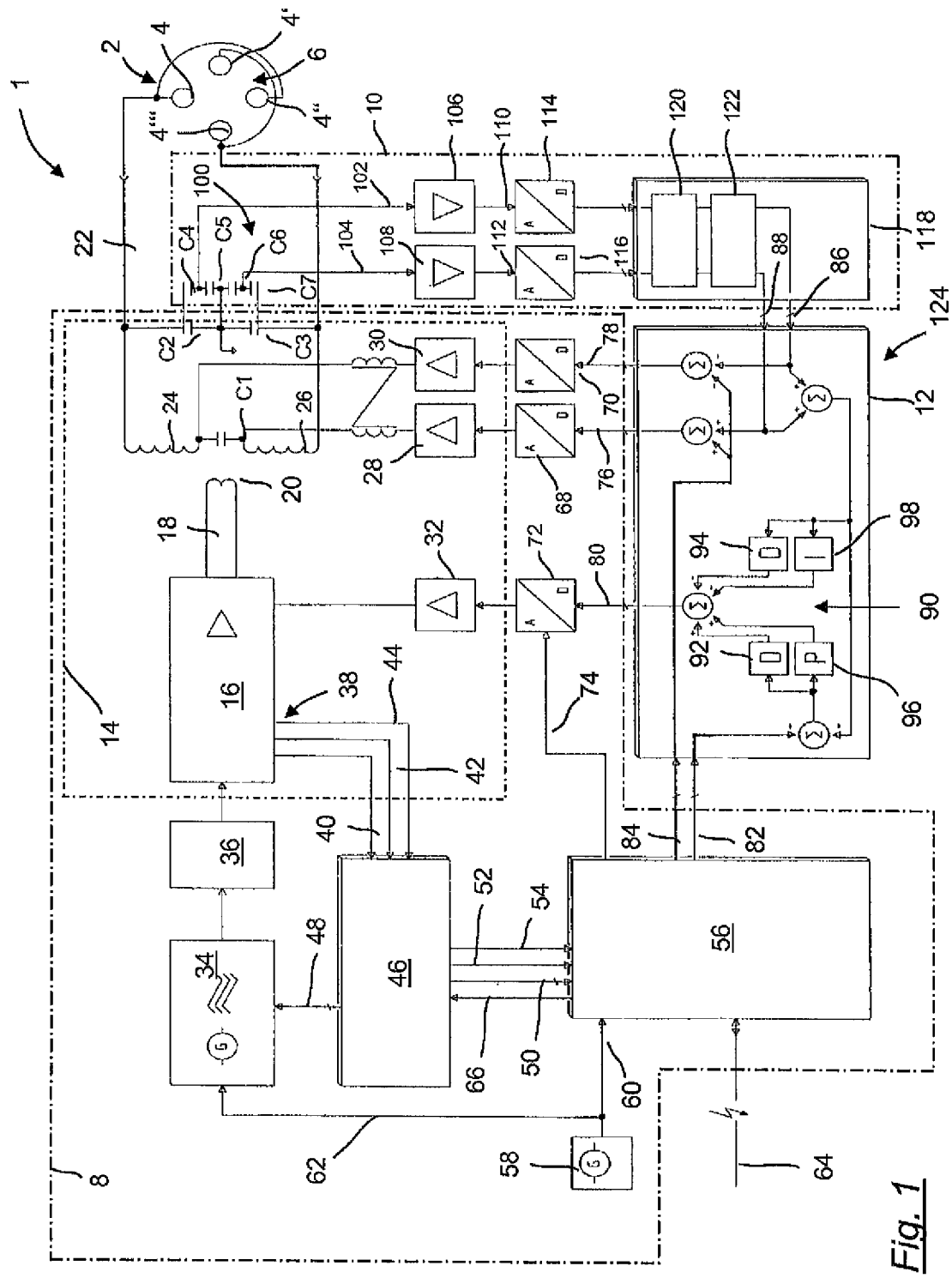

HIGH-FREQUENCY (HF) VOLTAGE SUPPLY SYSTEM AND METHOD FOR SUPPLYING A MULTIPOLE MASS SPECTROMETER WITH THE HF AC VOLTAGE USED TO GENERATE A MULTIPOLE FIELD

CROSS REFERENCE TO RELATED APPLICATIONS

This application is the National Stage of PCT/EP2011/050362 filed on Jan. 12, 2011, which claims priority under 35 U.S.C. §119 of German Application No. 10 2010 004 649.3 filed on Jan. 13, 2010, the disclosure of which is incorporated by reference. The international application under PCT article 21(2) was not published in English.

The invention relates to a high-frequency (HF) voltage supply system and a corresponding method for supplying a multipole mass spectrometer, in particular a quadrupole mass spectrometer, with the HF alternating current (AC) voltage used to generate a multipole field, in particular a quadrupole field.

A multipole mass spectrometer or quadrupole mass spectrometer is used to detect ions having a selected ratio of their mass to their charge (m/e). The ions are released from an ion source and subsequently pass through the multipole field or quadrupole field generated by means of the HF AC voltage, by which they are forced on a spiraling path and finally strike a detector. Ions having a mass-to-charge ratio deviating therefrom are deflected to the side and miss the detector, so that a selection of detectable ion types occurs.

The multipole field, in particular quadrupole field, is typically generated by multiple, in particular four, rod electrodes arranged parallel to one another. To generate the quadrupole field, a DC voltage and a high-frequency AC voltage superimposed on this DC voltage are applied to respective adjacent electrodes, the same electrical voltage being applied respectively to opposing rod electrodes. Therefore, two rod pairs of opposing rods result, a respective voltage on the second rod pair being phase shifted by 180° in relation to a respective voltage on the first rod pair. Other multipole mass spectrometers having more or fewer rods optionally have different phase shifts of adjacent rods.

An HF voltage generator typically delivers both the DC voltage and also the HF AC voltage to the rod electrodes. A voltage of several hundred to several thousand volts having a frequency in the range of several megahertz is required as the HF AC voltage. An implementation of the HF voltage generator as a resonance transformer is known, the HF AC voltage being generated in a secondary circuit by means of a primary circuit magnetically coupled to the secondary circuit. Only a small active power, but a high idle power are required to cover an operating power demand. The secondary circuit is an oscillating circuit. If the oscillating circuit is tuned to resonance, an active power demand is minimal. Furthermore, to be able to measure ions having a different mass-to-charge ratio, the HF voltage generator must also be settable in a broad amplitude range.

The primary circuit of the HF transformer comprises a coil, which excites coils or parts of a coil in the secondary circuit. The secondary circuit with its coils, in conjunction with a capacitor, the rods of the multipole system or quadrupole system, the capacitance of the electrical supply lines, and further capacitors, forms the oscillating circuit.

Known resonance transformers are tuned to resonance by settings on the capacitors in the secondary circuit or changes of the capacitance or by setting the inductance of the coils. Such tuning to resonance is already performed before or when the quadrupole mass spectrometer is first put into operation and can be required again and again thereafter as readjustment, if components in the secondary circuit change or the capacitive system changes because of a temperature dependence of the components in the secondary circuit. This has the result that according to the prior art, the HF voltage generator is typically first brought to an operating temperature in operation, so that the resonance transformer does not have to be repeatedly tuned.

In particular detuning of the oscillating circuit has an effect on the HF AC voltage and requires an increased active power demand, if an amplitude controller regulates to a target value of the HF AC voltage amplitude. One result is limiting of the maximum settable HF AC voltage amplitude.

For a measurement using the quadrupole mass spectrometer, a constant ratio of the HF AC voltage amplitude to the superimposed DC voltage is required. To be able to keep this ratio and the amplitude of the HF AC voltage constant, this amplitude is therefore typically continuously measured and used to regulate the power control of a power stage of the HF voltage generator and to generate the DC voltage.

To readjust the HF AC voltage in the secondary circuit, tapping, dividing down, rectifying, and comparing the HF AC voltage to a target value and finally readjusting the HF output stage accordingly are known. The rectifying must be performed with high precision, so that known rectifying methods are typically linked to high circuitry expenditure and require a complex correction of measuring errors. A so-called PID controller used for this purpose must therefore have high-grade dimensions and must be provided with components of high quality. The adaptation of the control parameters requires many actuators.

An HF voltage generator for a quadrupole mass spectrometer is known from JP 2002/033072 A, in which an HF voltage variable frequency is generated by means of a digitally settable HF oscillator. An envelope of the HP voltage is detected and compared to a sawtooth voltage. In response thereto, an error is ascertained which is entered as a variable in a digital PID controller. After a digital-analog conversion, this variable is used to control the voltage.

Furthermore, a mode is provided in this known HF voltage generator, in which measurement is not performed, but rather a resonance compensation occurs. For this purpose, the regulation of the amplitude is suppressed and a frequency is sought for which a maximum amplitude is achievable in the primary circuit.

A high-frequency voltage supply system is known from US 2001/0023923, in which the secondary circuit is first tuned to resonance with the primary circuit mechanically or by changing the turn ratio of coils. Subsequently, the amplitude of the AC voltage in the secondary circuit is only measured in analog form, compared in analog form to a similarly analog target value and thus a manipulated variable or an analog actual HF voltage value is determined and used to readjust the AC voltage amplitude in the primary circuit. Readjustment to resonance is not performed.

Furthermore, a quadrupole mass filter is known from DE 42 766 A1, which is also not readjusted to resonance. Instead, for example, by means of a digital frequency counter, the frequency of the AC voltage in the primary circuit is measured and used as a control variable for the AC voltage amplitude in the secondary circuit.

Finally, a voltage supply for a mass spectrometer of another construction, namely an ion trap mass spectrometer, is known from US 2009/0294657, an AC voltage being generated and being readjusted in such a manner that the power demand is minimal.

All known arrangements and methods for the HF voltage supply to generate a quadrupole field in a quadrupole mass spectrometer are technically complex to produce and operate, typically require components of high quality, a high circuitry expenditure, and complex error correction measures.

The invention is therefore based on the object of providing a precise HF voltage supply for a quadrupole mass spectrometer using simple means.

The invention achieves this object, proceeding from US 2001/0023923 A1, with an HF voltage supply system according to claim 1 and with an HF voltage supply method according to claim 9.

The HF voltage generator has frequency readjustment means. The frequency readjustment means automatically readjust the frequency in such a manner that the oscillating circuit is kept in resonance, in particular by exciting the primary circuit. In case of a deviation from the resonance case, the frequency is automatically readjusted to reproduce the resonance case by a readjustment method.

The HF voltage generator provides the HF AC voltage having an HF AC voltage amplitude which is set as a function of the AC voltage amplitude setting value. The HE voltage generator sets a desired frequency with quartz precision and also maintains this frequency with quartz precision, i.e., with a precision which is provided by oscillating procedures of a quartz.

The HF voltage measuring device is implemented according to the invention as a digital voltage meter, samples the HF voltage in the secondary circuit, and determines a digital measured value dependent on this HF AC voltage, which is a digital absolute actual HF voltage value because of the implementation as a digital voltage meter. Therefore, not only a relative comparison value, but rather the actual voltage is ascertained. Because of the implementation as a digital voltage meter, the actual HF voltage value can be ascertained very precisely in relation to an analog measuring device and is provided in digital form. A digitization connected downstream instead would result in inaccuracies, in contrast. The actual HF voltage value ascertained according to the invention does not have these inaccuracies.

The computing device determines, while using the digital measured value or the actual HF voltage value, a digital AC voltage amplitude setting value. This AC voltage amplitude setting value is, in particular in contrast to the prior art, not merely an error value which would result from the deviation of an actual value from a target value. In the invention, the computing device ascertains the digital AC voltage amplitude setting value as a function of the real actual HF voltage value, also as a function of a target HF voltage value, and as a further function of a frequency value of the AC voltage in the primary circuit. The target HF voltage value is, like the actual HF voltage value, an absolute voltage value which is also provided in digital form, like the frequency value. The target HF voltage value is preferably assigned to a respective mass to be detected. In particular, ions having different masses or a different mass-to-charge ratio can be detected using different target HF voltage values.

The frequency at which the HF voltage generator powers the primary circuit is precisely the frequency which must be digitally processed by the computing device for the calculations performed therein. Therefore, a frequency value of the HF AC voltage does not have to be measured first and provided to the computing device, but rather a frequency value is processed promptly by the computing device, so that the frequency and the AC voltage amplitude setting value can be changed essentially simultaneously and the scaling of the mass scale is maintained.

The computing device is implemented in such a manner that it knows and takes into consideration known relationships between a frequency change and a change of the actual HF voltage value. In conjunction with a digitally provided frequency value which is provided to the HF generator to set the AC voltage in the primary circuit and therefore indirectly to set the HF AC voltage in the secondary circuit, the computing device therefore calculates, in response to a frequency change of the voltage in the primary circuit, a new AC voltage amplitude setting value for a selected mass or a selected mass-to-charge ratio (m/e) as a function of this frequency value of the voltage in the primary circuit. The AC voltage amplitude setting value or a new value of the AC voltage amplitude in the primary circuit which is accordingly set is simultaneously delivered to a power stage of the HF voltage generator. This has the result that in spite of the frequency change, the scale of a mass scale of masses of ions to be detected does not change or at least hardly changes. In particular, a linear relationship exists between the HF AC voltage amplitude and the mass scale.

The invention therefore allows rapid and precise readjustment of the actual HF voltage value in the case of a frequency change and, on the basis of the completely digital controlled system, an adaptation of control parameters with little effort. In particular after or during a resonance compensation, which is required, for example, because of a thermally related change of the inductance and/or capacitance in the oscillating circuit, not only a new frequency but rather also a new HF AC voltage amplitude and preferably also a new DC voltage amplitude in the secondary circuit or oscillating circuit or at least one setting value required to achieve it is calculated.

The invention does not require any calibration substances as a reference. Because of the high-precision digitally measured AC voltage value in the secondary circuit, the invention provides mass linearity over the entire mass range. Therefore, for arbitrary masses, a suitable AC voltage amplitude setting value can be calculated and provided as a function of the respective frequency of the AC voltage in the primary circuit.

In a preferred embodiment, the HF voltage generator has a synthesizer, which sets and maintains the frequency in the primary circuit with quartz precision.

The resonance case or detuning of the oscillating circuit as a deviation from the resonance case can be ascertained in various ways.

In one embodiment of the invention, as a compensation criterion for a resonance case to be ascertained, one frequency of multiple frequencies is detected as the resonance frequency, for which the HF AC voltage amplitude in the secondary circuit or oscillating circuit and/or the alternating current amplitude in the primary circuit, in particular in the case of fixing of the AC voltage amplitude in the primary circuit, is maximal in relation to other frequencies. For this purpose, a frequency range having multiple frequencies lying closely around an expected value of the resonance frequency to be determined is defined and the frequency is varied within this frequency range. While searching for the maximal HF AC voltage amplitude and optionally while searching for the maximum alternating current amplitude in the primary circuit, the AC voltage amplitude in the primary circuit is temporarily fixed or the amplitude control circuit is temporarily disconnected.

For example, multiple actual HF voltage values in the oscillating circuit or alternating current values in the primary circuit are compared to one another for different frequencies, but for the same AC voltage amplitude setting values. Alternatively, the actual HF voltage values can be readjusted further in the direction of the target HF voltage value, the AC voltage amplitude setting values required for this purpose being concluded in the resonance case or detuning of the secondary circuit being recognized. The maximum amplitude results in the resonance case. The frequency provided at the maximum amplitude is stored as the resonance frequency and provided for the further method. In contrast, if no voltage maximum is ascertained, this is recognized as a malfunction case and an error routine is output.

In an alternative embodiment of the invention thereto, the resonance case or detuning of the secondary circuit relative to the primary circuit is alternatively or additionally ascertained by means of phase information or by means of a phase relationship. For this purpose, the frequency readjustment means have phase detection means, which repeatedly ascertain phase information or a phase relationship while passing through a frequency range, which was previously defined around an expected value of the resonance frequency to be determined.

In a first variant, a phase relationship is ascertained between the AC voltage in the secondary circuit and the alternating current in the primary circuit. The phase relationship is established in this case, for example, in that a maximum value of the AC voltage in the secondary circuit is related to a minimum value of the alternating current in the primary circuit. The frequency at which the maximum value of the AC voltage is coincident with the minimum value of the alternating current or at which the phase shift is 90° is recognized as a resonant frequency, at which the primary circuit is tuned in resonance with the secondary circuit and readjustment of the frequency is not necessary. However, if the resonance case is not provided, a required tuning direction is ascertained from the detected phase shift, in which subsequently the frequency is changed to reach the resonance frequency. For example, if the maximum value of the AC voltage leads the minimum value of the alternating current by more than a predetermined shift value, this is recognized as detuning of the secondary circuit relative to the primary circuit. The frequency readjustment means increase the frequency at which the primary circuit is excited in response thereto. In the other case, in which the minimum value of the alternating current leads the maximum value of the AC voltage by more than a predetermined shift value, detuning of the secondary circuit relative to the primary circuit is again recognized. However, in this case the frequency readjustment means decrease the frequency in order to obtain the resonance case again.

In a second variant, a phase relationship between the AC voltage in the secondary circuit and the alternating current in the secondary circuit is ascertained. The frequency at which the phase shift is 0° is recognized as a resonant frequency, at which the primary circuit is tuned in resonance with the secondary circuit and readjustment of the frequency is not necessary. A required tuning direction in which the frequency must be changed to reach the resonance case can be ascertained from a phase shift deviating from 0°. The frequency readjustment means therefore increase or decrease the frequency at which the primary circuit is excited according to the ascertained tuning direction.

The frequency readjustment means thus preferably recognize in any case minimal detuning of the secondary circuit or deviation from the resonance frequency in a timely manner and counteract this minimal detuning by corresponding readjustment, so that measurements using the multipole mass spectrometer can always essentially be performed in the resonance case.

The HF voltage supply system has an HF voltage measuring device, a computing device, and an HF voltage generator, each preferably as described above. Terms such as "a" or "one" are to be understood here as at other points of the description and in the claims not as numerals but rather as indefinite articles.

The HF voltage supply system is preferably implemented in such a manner that the resonance compensation is automatically suspended during a measurement using the quadrupole mass spectrometer. Alternatively or additionally, manual suspension can be provided. It is thus ensured that the conditions in the quadrupole mass spectrometer essentially do not change during a measurement. The HF generator holds the set or regulated frequency with quartz precision. A relevant deviation from the resonance case is not to be expected, because during a measuring time at most slight detuning of the secondary circuit could thus result, which does not require readjustment of the frequency.

The HF voltage supply system or the HF voltage generator also preferably has frequency provision means, by means of which the currently set frequency is digitally provided to the computing device. The frequency can optionally be transmitted directly from the synthesizer to the computing device or vice versa from the computing device to the synthesizer or the HF voltage generator. In any case, a common frequency is used both by the computing device for the calculations performed therein and also set on the HF voltage generator in the primary circuit. The computing device uses the frequency to determine the AC voltage amplitude setting value and/or to determine a DC voltage amplitude setting value. In particular, the computing device delivers two separate DC voltage amplitude setting values for the positive and negative DC voltages, which are applied to a first or a second rod electrode pair, respectively.

In a preferred embodiment, the measuring device has an HF voltage divider, which separates the sampled HF AC voltage from a superimposed DC voltage and divides it down to a lower, directly measurable voltage, preferably in a ratio or total divider ratio between 100:1 and 5000:1. The HF voltage divider preferably comprises multiple dividers, whose respective division ratios cooperate to form the total division ratio of the HF voltage divider.

The HF voltage divider is preferably implemented as a capacitive divider, particularly preferably as a capacitive double divider, which divides down the sampled HF AC voltage in a first step in a first ratio and in a second step in a second ratio. The first ratio is preferably between 25:1 and 35:1, particularly preferably substantially 30:1. The second ratio is also preferably between 25:1 and 35:1, particularly preferably substantially 30:1. The voltage is thus divided down at high precision to an easily measurable voltage, from which, after its measurement, the original HF AC voltage can in turn easily be concluded at high precision.

In a preferred embodiment, the measured value determination means comprise an analog-digital (A/D) converter. The A/D converter allows digitization of the tapped signal at high precision before further processing of the signal. The digital measured value is therefore entered as an input variable in a complicated control chain, which can be implemented as completely digital and therefore nonetheless using simple means.

The A/D converter is implemented in such a manner that a sampling cycle, using which the measurable voltage is sampled, is held in a fixed ratio to the frequency in the secondary circuit and a constant intermediate frequency independent of the resonance frequency. A constant number of measured values per amplitude is thus provided, the measured values advantageously being provided continuously as input variables for calculations of the computing device.

The computing device preferably ascertains not only the HF AC voltage amplitude setting value, but rather additionally a DC voltage amplitude setting value for setting the DC voltage amplitude of the DC voltage, which is superimposed on the HF AC voltage. For the calculation of the DC voltage amplitude setting value, the computing device preferably uses the actual HF voltage value and the target HF voltage value of the HF AC voltage. In a refinement, the computing device additionally uses the frequency value for the calculation of the DC voltage amplitude setting value, a DC voltage amplitude setting value preferably being ascertained in each case for a positive and a negative HF voltage value.

In a preferred refinement, the computing device additionally uses, for the calculation of the AC voltage amplitude setting value and/or for the calculation of the DC voltage amplitude setting value, the rod radius of a rod-shaped electrode of the multipole or quadrupole mass spectrometer or the field radius of the multipole or quadrupole field, the rod radius, in particular in the case in which the electrode is a cylindrical rod-shaped electrode, being in a fixed ratio, in particular 1.144:1, to the field radius.

The HF AC voltage amplitude settable by means of the AC voltage amplitude setting value and/or the DC voltage amplitude settable by means of the DC voltage amplitude setting value is calculated according to the invention from known interactions in the multipole or quadrupole mass spectrometer. In particular, the invention uses formulas or equations which are based on the measurement principle of the quadrupole mass spectrometer, published in the year 1953 by Paul. By means of the known interactions or by means of these formulas, the AC voltage amplitude setting value or DC voltage amplitude setting value is calculated and rapidly recalculated in a simple manner, for example, in the case of a frequency change.

The computing device preferably provides a controller, in particular a DPID controller, having at least the actual HF voltage value and the frequency value as the input variables and the AC voltage amplitude setting value as the output variable. The DPID controller comprises two differentiating elements (D), a proportional component of the amplification (P), and an integrating control element (I).

The computing method can be performed by means of a computer program product, which, in particular by means of algorithms, provides the functionality of the computing device. In particular by means of the computer program product, the AC voltage amplitude setting value and/or the DC voltage amplitude setting value can be calculated as a function of the actual HF voltage value, the target HF voltage value, and the frequency value, and optionally as a function of the rod radius or field radius.

Further embodiments result from the claims and from the exemplary embodiment, which is explained in greater detail on the basis of the drawing. In the figures of the drawing:

FIG. 1 shows a circuit diagram of an HF voltage supply system according to an exemplary embodiment of the invention and FIG. 2 shows a simplified block diagram for the supplementary illustration of the most important method steps of a method which can be performed by means of the HF voltage supply system of FIG. 1.

FIG. 1 shows an HF voltage supply system 1 according to an exemplary embodiment of the invention next to a quadrupole arrangement 2, which can be supplied with an HF AC voltage by the HF voltage supply system 1. The quadrupole arrangement 2 is part of a quadrupole mass spectrometer, which can be used for detecting ions having a selected mass-to-charge ratio. The quadrupole arrangement 2 has four cylindrical rod-shaped electrodes 4, 4', 4", and 4"' arranged parallel to one another. The respective opposing electrodes 4 and 4" as the first electrode pair and 4' and 4"' as the second electrode pair are interconnected and are therefore at the same potential in pairs. Upon application of an HF AC voltage, a quadrupole field 6 is formed between the electrode pairs. The quadrupole field 6 has a field radius $r_0$. The electrodes 4, 4', 4", and 4"' have a rod radius r, which is preferably 1.144 times the value of the field radius $r_0$, because the quadrupole field, which must actually be generated by means of hyperbolic electrodes, is simulated comparatively well in this way by the cylindrical electrodes 4, 4', 4", and 4"'.

The HF voltage supply system 1 has an HF voltage generator 8, which generates the HF AC voltage for the quadrupole arrangement 2. Furthermore, the HF voltage supply system 1 has an HF voltage measuring device 10 for measuring the AC voltage applied to the quadrupole arrangement 2. Finally, the HF voltage supply system 1 has a computing device 12, which receives various measured values or preset values, processes these values according to specific algorithms, and finally delivers values obtained from this processing to the HF voltage generator 8, which generates the HF AC voltage for the quadrupole arrangement 2 as a function of these values.

The HF voltage generator 8 has HF AC voltage provision means 14. The HF AC voltage provision means 14 comprise a power stage 16, which generates an AC voltage and provides it to a primary circuit 18 also associated with the HF AC voltage provision means 14. A coil 20 is arranged as the primary coil in the primary circuit 18.

By means of the coil 20, a secondary circuit 22 is excited, which conducts the HF AC voltage. For this purpose, the secondary circuit 22 has two coils 24 and 26 as secondary coils. Furthermore, the secondary circuit 22 has capacitors C1, C2, and C3. The quadrupole arrangement 2 and connecting conductors are also associated with the secondary circuit 22. The electrical lines and the electrodes 4, 4', 4", and 4"' form, together with the capacitors C1, C2, and C3, the capacitive components of the secondary circuit 22.

The DC voltage component in the HF AC voltage in the secondary circuit 22 is delivered by voltage supplies 28 and 30. The voltage supplies 28 and 30 are supplied, for example, with a positive and a negative DC voltage of 420 V and in turn provide a settable positive or negative DC voltage of, for example, 400 V.

A further voltage supply 32 is supplied, for example, with a voltage of 48 V at a power of 40 W and delivers a settable voltage to the power stage 16, so that by means of the voltage supply 32, the amplitude of the AC voltage in the primary circuit 18 can be controlled.

The amplitude of the HF AC voltage in the secondary circuit 22 is dependent on the amplitude of the AC voltage in the primary circuit 18. After superposition with the DC voltage component, the secondary circuit 22 finally delivers a positive or negative voltage of, for example, up to 1800 V to the electrodes 4 and 4" or 4' and 4"'.

The amplitude of the HF AC voltage in the secondary circuit 22 is maximal when the secondary circuit 22 is excited by the primary circuit 18 at its resonance frequency. The resonance frequency of the secondary circuit 22 is essentially dependent on the capacitances of the plug, the cable and the quadrupole or the quadrupole arrangement 2 and on the inductances of the coils 24 and 26.

Traditionally, the above-mentioned capacitors C1, C2, and C3 are therefore often provided in parallel to the inductances of the coils 24 and 26, in order to be able to produce resonance, by a setting on the capacitors C1, C2, and C3 and/or a change of the line capacitances by means of change of the line length, if the secondary circuit 22 is detuned. Alternatively or additionally, in known methods, the inductance of the oscillating circuit 22 is changed, or in particular by changing the turn number of the coils 24 and 26, by introducing short-circuit turns or ferromagnetic or diamagnetic material into the coils 24 and 26, or by using transductors. However, all of these known methods require a high mechanical expenditure and nonetheless worsen the stability of the oscillation of the oscillating circuit 22 to resonance with the primary circuit 18 or the stability of the resonant circuit.

In the invention, in contrast, the setting to resonance frequency is not performed mechanically but rather electronically, by corresponding excitation of the primary circuit 18 or by control of the frequency of the AC voltage in the primary circuit 18. For this purpose, the HF voltage generator 8 has a synthesizer 34, which is particularly implemented as a programmable phase accumulator. The synthesizer 34 generates and holds a set frequency with quartz precision and delivers this set frequency via a driver stage 36 to the power stage 16, so that the frequency of the AC voltage in the primary circuit 18 is set according to the frequency set by the synthesizer.

For tuning to resonance frequency, the HF voltage supply system 1 in the exemplary embodiment shown ascertains a phase relationship between the voltage in the secondary circuit 22 and the current in the primary circuit 18. In particular, the secondary circuit 22 is tuned to resonance when a maximum value of the AC voltage in the secondary circuit 22 is coincident with a minimum value of the alternating current in the primary circuit 18. Alternatively, other values of the current or the voltage can be related to one another, for example, flanks of the alternating current and the AC voltage can be observed and related to one another. In each case, the HF voltage generator has phase detection means 38 which, for example, in the region of the power stage 16, ascertain phase information or a phase relationship between the current in the primary circuit 18 and the voltage in the secondary circuit 22 and transmit this phase information or information about the phase relationship digitally via data lines 40 and 42, optionally together with temperature data via a further data line 44, to frequency readjustment means 46.

Alternatively or additionally to the described exemplary embodiment, the resonance frequency can be ascertained by means of a phase relationship between the voltage in the secondary circuit 22 and the current in the primary circuit 18. Alternatively or additionally, to ascertain the resonance frequency, the frequency is varied in a frequency range around the expected frequency and the frequency at which the AC voltage amplitude of the oscillating circuit or secondary circuit is maximal is ascertained as the resonance frequency. The resonance compensation occurs after a disconnection of the amplitude control circuit or with suspended automatic readjustment of the amplitude. Alternatively or additionally, the resonance frequency is ascertained by establishing the maximum alternating current amplitude in the primary circuit. The automatic amplitude regulation can either be suspended or can operate further.

The frequency readjustment means 46 act as a tuner for the synthesizer 34 and are preferably implemented in an application-field-programmable arrangement of logic gates or a so-called "field programmable gate array (FPGA) block". The frequency readjustment means 46 recognize, on the basis of the phase information of the current in the primary circuit 18 and the voltage in the secondary circuit 22, a possible detuning of the secondary circuit 22 or whether the primary circuit 18 is tuned to resonance with the secondary circuit 22. In the case in which a maximum value of the AC voltage in the secondary circuit 22 is coincident with a minimum value of the alternating current in the primary circuit 18, the current frequency generated by the synthesizer 34 is recognized as the resonance frequency. This frequency and therefore also the frequency in the primary circuit 18 are therefore maintained. A corresponding control value is transmitted via a data line 48 for this purpose to the synthesizer 34. In contrast, if the maximum value of the AC voltage leads the minimum value of the alternating current by more than a predetermined phase shift value, the frequency is increased. In the case in which the minimum value of the alternating current leads the maximum value of the AC voltage by more than a predetermined phase shift value, the frequency is decreased. Even in the case of minimal detuning of the secondary circuit, the primary circuit 18 is thus already tuned again to resonance with the secondary circuit 22.

A set frequency value and information about a failed or successful tuning to resonance frequency are transmitted via data lines 50, 52, and 54 to a data interface 56 comprised by the AC voltage provision means 14. The data interface 56 is synchronized with the synthesizer 34, both the data interface 56 and also the synthesizer 34 receiving a signal having a frequency of, for example, 50 MHz from a clock generator 58 via signal lines 60 and 62. The data interface 56 is connected to a higher-order control unit via a bidirectional data line 64, which can be implemented as optical, for example, for galvanic isolation. Via this data line 62, it can therefore be communicated to the data interface 56 that a measurement is to be performed using the quadrupole mass spectrometer. In this case, the data interface 56 transmits, via a data line 66, a signal to the frequency readjustment means 46, which suppresses readjustment of the frequency in the primary circuit 18 in response to this signal, either as long as this signal is provided or until a resolving signal is received. However, during the measurement, the frequency is still held with quartz precision, so that the resonance case remains essentially maintained during typical measuring times.

The HF voltage generator 8 also has digital-analog (D/A) converters 68, 70, and 72, via which the voltage supplies 28, 30, and 32 are activated in analog form in response to incoming digital signals at the D/A converters 68, 70, and 72. The D/A converter 72 is switched on or off via the data interface 56 via a signal line 74. The D/A converters 68, 70, and 72 receive digital input signals, according to which voltages are set at the voltage supplies 28, 30, and 32, via data lines 76, 78, and 80 from the computing device 12.

The computing device 12 ascertains voltage values to be set for the amplitude of the AC voltage in the primary circuit 18 and for the DC voltage components of the HF AC voltage in the secondary circuit 22 completely digitally on the basis of values which the computing device 12 receives via data lines 82 and 84 via the data interface 56 and via data lines 86 and 88 from the HF voltage measuring unit 10. In particular, via the data line 82, a target HF voltage value of the HF AC voltage in the secondary circuit 22 and the current frequency set by means of the frequency readjustment means 46 at the synthesizer 34 are transmitted to the computing device 12. Additional information about the rod radius r or the field radius $r_0$ is optionally transmitted via the data line 82. The data or information transmitted via the data line 82 are processed in a digital DPID controller together with actual HF voltage values, which arrive at the computing device via the data lines 86 and 88.

The DPID controller 90 has two differentiation elements 92 and 94, a proportional element 96, which ensures a proportional component of the amplification, and an integrating control element 98. The DPID controller 90 processes real actual or target voltage values and delivers, via the data line 80 and via the D/A converter 72, an AC voltage amplitude setting value to the HF AC voltage amplitude provision means, in particular to the voltage supply 32, which determines, via the power stage 16, the absolute value of the AC voltage in the primary circuit 18 and thus also influences the absolute value of the HF AC voltage in the secondary circuit 22.

As a special feature, the DPID controller also processes the set frequency in the primary circuit 18, any possible effects of a frequency change in the primary circuit 18 on the absolute value of the HF AC voltage amplitude in the secondary circuit 22 also being able to be calculated and therefore a compensation being able to be calculated and set via the AC voltage amplitude setting value, before a deviation, in particular a large deviation, of the actual HF voltage value from the target HF voltage value actually occurs.

The computing device 12 uses known interactions in the secondary circuit, in particular according to the known formulas of Paul, for calculating the AC voltage amplitude setting value as a function of, for example, via the geometry of the quadrupole arrangement 2, settable parameters and/or control parameters, in particular the measured values of the HF AC voltage amplitude in the secondary circuit 22, to calculate the AC voltage amplitude setting value or to calculate two DC voltage amplitude setting values, which are provided via the data lines 76 and 78 to set the DC voltage component superimposed on the HF AC voltage in the secondary circuit 22. To calculate the DC voltage amplitude values, the computing device 12 uses actual HF voltage values separately acquired via the data lines 86 and 88, each in conjunction with values which are acquired via the data line 84 from the data interface 56.

The computing device 12 sets the AC voltage amplitude setting value and the DC voltage amplitude setting value in such a manner that the ratio of the HF AC voltage amplitude in the secondary circuit 22 to the superimposed DC voltage amplitude is kept constant. Furthermore, the computing device 12 ensures that scaling of a mass scale does not change or does not substantially change in spite of a frequency change.

The HF voltage measuring unit 10 has as sampling means an HF voltage divider 100, which is implemented as a capacitive double divider. By means of capacitors C4, C5, C6, and C7, voltages in the secondary circuit 22 are tapped and conducted via electrical lines 102 and 104 and via interposed impedance converters 106 and 108 or buffers and electrical conductors 110 and 112 to analog-digital (A/D) converters 114 and 116, which generate digital voltage values in response to the tapped voltages. The digital voltage values are provided to measured value determination means 118 of the HF voltage measuring device 10, which in turn have a data memory 120 for buffering incoming values and amplitude determination means 122 for determining of digital measured values of the amplitude of the HF AC voltage. Like the frequency readjustment means 46, the measured value determination means 118, the computing device 12, and the data interface 56 are also implemented by means of an application-field-programmable arrangement of logic gates or by means of a "field programmable gate array (FPGA) block". Multiple FPGAs or one shared FPGA can be provided.

The measured value determination means 118 form, together with the A/D converters 114 and 1,16, one or two A/D converters having subsampling. A sampling frequency $f_{CLK}$ is derived from the frequency $f_{IN}$ set by means of the frequency readjustment means 46. This frequency is therefore digitally supplied via a data line (not shown) to the A/D converter 114 or 116. A constant numerically provided intermediate frequency $f_{ZP}$ thus results, so that a uniform number of measured values is provided per amplitude. The sampling frequency $f_{CLK}$ must be $f_{IN}$-$2f_{ZF}$.

The measured value determination means 118 cause a rectification of sampled values on the numeric level, which can alternately also be omitted, however. The digital measured value or the digital measured values which are provided via the data lines 86 and 88 to the computing device 12 are finally obtained from peak values or alternatively from absolute existing values of the sampling values present in the data memory 120.

The solely digital processing of the digital downmixing to an intermediate frequency in conjunction with the DPID controller 90 of the computing device 12 allows easy adaptation of control parameters to the complicated controlled system for amplitude regulation of the AC voltage in the primary circuit 18.

The HF voltage supply system 1 has, by means of the frequency readjustment means 46, frequency provision means, by means of which the frequency currently set via the data line 48 on the synthesizer 34 can also be digitally provided via the data line 50, via the data interface 56, and via the data line 82, and optionally via the data line 84 to the computing device 12. The computing device 12 uses this frequency for the calculation of the AC voltage amplitude setting value and optionally for the calculation of the HF DC voltage amplitude setting value.

The computing device 12 can be hardware, on which the functionality of the computing device 12, in particular the DPID controller 90, is provided by means of a computer program product 124. The computer program product 124 provides rules, according to which, from measured values and optionally stored constants and/or variables, the data for activating the A/D converters 68, 70, and 72 via the data lines 76, 78, and 80 are generated and provided.

FIG. 2 shows a simplified block diagram for the supplementary illustration of the most important method steps of an HF voltage supply method 130 which can be performed by means of the HF voltage supply system 1 of FIG. 1. The HF voltage supply method 130 comprises an HF voltage generation method 132, which comprises all method steps which can be performed by means of the HF voltage generator 8 of FIG. 1. Furthermore, the HF voltage supply method 130 comprises an HF voltage measuring method 134, which comprises all method steps which can be performed using the HF voltage measuring device 10 of FIG. 1. Finally, the HF voltage supply method 130 also comprises a computing method 136, which comprises all method steps which can be performed using the computing device 12 of FIG. 1 or by means of the software program product 124.

The HF voltage generator 8 generates, by means of the HF voltage generation method 132, the AC voltage 138 in the primary circuit 18, which was already mentioned in the description of FIG. 1 and was not yet designated. By means of magnetic coupling 140 or by means of the coils 20, 24, and 26, the primary circuit 18 and the secondary circuit 22 are coupled to one another, in particular in resonance. Therefore, the above-mentioned HF AC voltage 142, which was not yet designated, is generated in the secondary circuit 22. This HF AC voltage 142 supplies the quadrupole arrangement 2, but is also tapped by the HF voltage measuring device 10 and therefore supplied to the HF voltage method 134. Dividing down 144 of the HF AC voltage 142 to a subvoltage 146 is performed. According to the description of the HF voltage measuring device 10 in FIG. 1, by means of the HF voltage measuring method 134, finally actual HF voltage values 148, which are assigned to the voltages at the electrode pairs 4 and 4" or 4' and 4''', are generated and supplied to the computing method 136 or the computing device 12. The HF voltage measuring method 134 optionally previously carries out a numeric rectification of the actual HF voltage values 148 or of values from which the actual HF voltage values 148 originate.

The computing method 136 uses, for voltage control as further input variables, a target HF voltage value 150, which is provided by the data interface 56, and the also above-mentioned frequency value 152, which was not yet designated, via the data interface 56, so that the computing method 136 can use the frequency value 152 for its calculations. Optionally, the target HF voltage value 150 or the frequency value 152 is not transmitted directly, but rather variables are transmitted, whose absolute values are dependent on the target HF voltage value 150 and/or frequency value 152, or contain the target HF voltage value 150 and/or frequency value 152.

The computing method 136 calculates, via the DPID controller 90, the above-mentioned digital AC voltage amplitude setting value 154, which was not yet designated, and provides it to the HF voltage generation method for readjustment of the AC voltage amplitude. Furthermore, the computing method 136 calculates the above-mentioned digital DC voltage amplitude setting value 156, which was not yet designated, and which comprises a pair of values for a positive and a negative DC voltage amplitude for the first electrode pair 4 and 4" and/or the second electrode pair 4' and 4'''.

Overall, the invention allows a stable and precise voltage supply having a high-frequency AC voltage for the quadrupole arrangement 2 of a quadrupole mass spectrometer or alternatively for a multipole arrangement of another multipole mass spectrometer (not shown).

All features mentioned in the above description and in the claims are usable both individually and also in any arbitrary combination with one another. The disclosure of the invention is therefore not restricted to the combination of features described or claimed. Rather, all combinations of features are to be considered as disclosed.

The invention claimed is:

1. A high-frequency (HF) voltage supply system for supplying a multipole mass spectrometer, in particular a quadrupole mass spectrometer, with the HF AC voltage (142) used to generate a multipole field, in particular a quadrupole field (6), in a secondary circuit (22) excited by means of a primary circuit (18), comprising
    an HF voltage measuring device (10), by means of which the HF AC voltage (142) in the secondary circuit (22) can be sampled and an actual HF voltage value dependent on this HF AC voltage (142) can be ascertained,
    an AC voltage amplitude setting value (154) being able to be determined as a function of this actual HF voltage value, a target HF voltage value and a frequency, and
    comprising an HF voltage generator (8), by means of which the HF AC voltage (142) can be provided having an HF AC voltage amplitude set as a function of the AC voltage amplitude setting value (154),
    the HF voltage generator (8) comprising a synthesizer (34) for setting and holding with quartz precision the frequency of the AC voltage (138) in the primary circuit (18) according to a frequency value (152) set on the synthesizer (34), and the HF voltage generator (8) comprising frequency readjustment means (46), for ascertaining the resonance case of the secondary circuit (22) or a deviation from the resonance case and, in case of a deviation from the resonance case, for automatically readjusting the frequency of the AC voltage (138) in the primary circuit (18) in such a manner that the resonance case is reproduced and therefore the secondary circuit (22) is held at resonance by controlling the frequency of the AC voltage (138) in the primary circuit (18),
    the HF voltage supply system (1) being implemented in such a manner that in response to a frequency change of this AC voltage (138) in the primary circuit (18), as a function of a new frequency of this AC voltage (138) in the primary circuit (18), a new AC voltage amplitude setting value (154) is determined and provided to the HF voltage generator (8) to set the AC voltage (138) in the primary circuit,
    wherein the high-frequency (HF) voltage supply system (1) comprises a computing device (12), for calculating the AC voltage amplitude setting value (154) as a digital value as a function of the actual HF voltage value (148), of the target HF voltage value (158), and further as a function of the frequency value (152), which is currently set at the synthesizer and is provided the computing device (12), of the AC voltage (138) in the primary circuit (18) and as a function of the rod radius (r) of a rod-shaped electrode (4, 4', 4", 4''') of the multipole mass spectrometer or of the field radius ($r_0$) of the multipole field, the HF voltage supply system (1) comprising frequency provision means for providing the frequency value, currently set on the synthesizer, digitally to this computing device (12), and the HF voltage measuring device (10) being implemented as a digital voltage meter for digitally ascertaining the actual HF voltage value as a digital absolute measured value.

2. The high-frequency (HF) voltage supply system according to claim 1,
    wherein the resonance compensation can be automatically suspended during a measurement using the multipole mass spectrometer, the currently set frequency being able to be held with quartz precision according to the frequency value (152), and the frequency value (152) currently set on the synthesizer (34) being usable by the computing device (12) to determine the AC voltage amplitude setting value (154) and/or the DC voltage amplitude setting value (156).

3. The high-frequency (HF) voltage supply system according to claim 1,
    wherein the high-frequency (HF) voltage measuring device (10) comprises sampling means for sampling the HF AC voltage (142) and measured value determination means (118) for determining a digital measured value dependent on this HF AC voltage (142), the digital measured value being able to be digitally ascertained as an absolute actual HF voltage value (148).

4. The high-frequency (HF) voltage supply system according to claim 1,
    wherein the HF voltage measuring device (10) comprises an HF voltage divider (100), implemented as a capacitive double divider, as the sampling means, by means of which the sampled HF AC voltage (142) is separable from a superimposed DC voltage and can be divided down to a lower, directly measurable subvoltage (146), preferably in a ratio between 100:1 and 1000:1, the sampled HF AC voltage (142) being able to be divided down in a first step in a first ratio, preferably in a ratio between 25:1 and 35:1, particularly preferably 30:1, and in a second step in a second ratio, preferably in a ratio between 25:1 and 35:1, particularly preferably 30:1, the HF voltage measuring device (10) comprising an analogdigital (A/D) converter (114), by means of which the digital measured value can be determined, in particular from the subvoltage (146), and, by means of the measured value determination means (118), a sampling cycle can be held in a fixed ratio to the frequency of the HF AC voltage (142) and therefore a constant intermediate frequency.

5. The high-frequency (HF) voltage supply system according to claim 1,
wherein the computing device (12) comprises control value determination means, by means of which, using at least one digital measured value of the HF AC voltage (142), the digital AC voltage amplitude setting value (154) for setting the AC voltage amplitude in the primary circuit (18) can be determined.

6. The high-frequency (HF) voltage supply system according to claim 1,
wherein by means of the computing device (12), as a function of the actual HF voltage value (148), of the target HF voltage value (150) and of the frequency value (152) of the AC voltage (138) in the primary circuit (18), in addition a digital DC voltage amplitude setting value (156) for setting the DC voltage amplitude of the DC voltage superimposed on the HF AC voltage (142) can be ascertained, the dependence in the ascertainment of the AC voltage amplitude setting value (154) and/or the DC voltage amplitude setting value (156) additionally extends to the rod radius (r) of a rod-shaped electrode (4, 4', 4", 4''') of the multipole mass spectrometer or to the field radius ($r_0$) of the multipole field (6), and the AC voltage amplitude, which is settable by means of the AC voltage amplitude setting value (154), in the primary circuit (18) and/or the DC voltage amplitude, which is settable by means of the DC voltage amplitude setting value (156), in the secondary circuit (22) can be calculated by means of known interactions in the multipole mass spectrometer, in particular according to the formulas of Paul, and the AC voltage amplitude setting value (154) or DC voltage amplitude setting value (156) can be calculated therefrom, and, by means of the computing device (12), a controller, in particular a DPID controller (90), can be provided as the control value determination means, having at least the actual HF voltage value (148) and the frequency value (152) as input variables and the AC voltage amplitude setting value (154) as the output variable.

7. The high-frequency (HF) voltage supply system according to claim 1,
wherein the high-frequency (HF) voltage generator (8) comprises HF AC voltage provision means (14), by means of which the HF AC voltage (142) can be provided having an HF AC voltage amplitude set as a function of an AC voltage amplitude setting value (154), and the HF voltage generator (8) having amplitude detection means, by means of which, for various frequencies lying in a frequency range defined around an expected resonance frequency, an AC voltage amplitude of the secondary circuit (22) and/or an alternating current amplitude of the primary circuit (18) can be ascertained, the frequency readjustment means (46) being implemented in such a manner that they recognize and store the frequency as the resonance frequency at which the AC voltage amplitude or alternating current amplitude is maximal.

8. The high-frequency (HF) voltage supply system according to claim 1,
wherein the high-frequency (HF) voltage generator (8) comprises HF AC voltage provision means (14), by means of which the HF AC voltage (142) can be provided having an HF AC voltage amplitude set as a function of an AC voltage amplitude setting value (154),
and comprises phase detection means (38), by means of which a phase relationship between the AC voltage (142) in the secondary circuit (22) and the alternating current in the primary circuit (18) and/or the alternating current in the secondary circuit (22) can be ascertained for various frequencies lying in a frequency range defined around an expected resonance frequency, the frequency readjustment means (46) being implemented in such a manner that in the case in which a phase relationship of 90° between the AC voltage (142) in the secondary circuit (22) and the alternating current in the primary circuit (18) is ascertained and/or a phase relationship of 0° between the AC voltage (142) in the secondary circuit (22) and the alternating current in the secondary circuit (22) is ascertained, the respective frequency is recognized as the resonance frequency and otherwise, if a phase shift deviating respectively by more than a predetermined phase shift value is ascertained, a tuning direction is ascertained from this phase shift and the frequency is increased or decreased according to this tuning direction.

9. A high-frequency (HF) voltage supply method for supplying a multipole mass spectrometer, in particular a quadrupole mass spectrometer, with the HF AC voltage (142) used to generate a multipole field, in particular a quadrupole field (6), in a secondary circuit (22) excited by means of a primary circuit (18), an HF voltage measuring device (10) sampling the HF AC voltage (142) and determining an actual HF voltage value dependent on this HF AC voltage (142), an AC voltage amplitude setting value (154) being determined as a function of this actual HF voltage value, a target HF voltage value and a frequency, and an HF voltage generator (8) providing the HF AC voltage (142) having an HF AC voltage amplitude set as a function of the AC voltage amplitude setting value (154),
a synthesizer (34) of the HF voltage generator (8) sets and holds with quartz precision by means of an HF voltage supply method the frequency of the AC voltage (138) in the primary circuit (138) according to a frequency set on the synthesizer (34) and frequency readjustment means (46) detect the resonance case of the secondary circuit (22) or a deviation from the resonance case and in case of a deviation from the resonance case automatically readjust the frequency of the AC voltage in the primary circuit (18) in such a manner that the resonance case is reproduced and therefore hold the secondary circuit (22) in resonance by controlling the frequency of the AC voltage (138) in the primary circuit (18), and in response to a frequency change of this AC voltage (138) in the primary circuit (18), as a function of a new frequency of this AC voltage (138) in the primary circuit (18), a new AC voltage amplitude setting value (154) is determined and provided to the HF voltage generator (8) to set the AC voltage (138) in the primary circuit (18),
wherein a computing device (12) ascertains, by means of a computing method (136), the AC voltage amplitude setting value (154) as a digital value as a function of the actual HF voltage value (148), of the target HF voltage value (150), and
furthermore as a function of the frequency value (152), which is currently set at the synthesizer and is provided the computing device (12), of the AC voltage (138) in the primary circuit (18), and as a function of the rod radius (r) of a rod-shaped electrode (4, 4', 4", 4''') of the multipole mass spectrometer or of the field radius ($r_0$) of the multipole field, frequency provision means providing the frequency value, currently set on the synthesizer (34), digitally to this computing device (12), and the HF voltage measuring device (10) being implemented as a digital voltage meter digitally ascertain the actual HF voltage value as a digital absolute measured value by means of an HF voltage measuring method (134).

10. The high-frequency (HF) voltage supply method according to claim 9,
    wherein sampling means sample the HF AC voltage (142) and measured value determination means (118) determine the digital measured value dependent on this HF AC voltage (142).

11. The high-frequency (HF) voltage supply method according to claim 9, wherein HF AC voltage provision means (14) of an HF voltage generator (8) provide the HF AC voltage (142) having an HF AC voltage amplitude set as a function of an AC voltage amplitude setting value (154), amplitude detection means of the HF voltage generator (8), for various frequencies lying in a frequency range defined around an expected resonance frequency, ascertain an AC voltage amplitude of the secondary circuit (22) and/or an alternating current amplitude of the primary circuit (18), and the frequency readjustment means (46) recognize the frequency, at which the AC voltage amplitude or alternating current amplitude is maximal, as the resonance frequency and store it.

12. The high-frequency (HF) voltage supply method according to claim 9,
    wherein HF AC voltage provision means (14) of the HF voltage generator (8) provide the HF AC voltage (142) having the HF AC voltage amplitude set as a function of an AC voltage amplitude setting value (154), and the HF voltage generator (8) comprising phase detection means (38), which ascertain a phase relationship between the AC voltage (142) in the primary circuit (18) and the alternating current in the primary circuit (18) and/or the alternating current in the secondary circuit (22), the HF voltage generator (8), in the case in which a phase relationship of 900 is ascertained between the AC voltage (142) in the secondary circuit (22) and the alternating current in the primary circuit (18) and/or a phase relationship of 00 is ascertained between the AC voltage (142) in the secondary circuit (22) and the alternating current in the secondary circuit(22), recognizes the respective frequency as the resonance frequency and otherwise, if a respective phase shift deviating by more than a predetermined phase shift value is ascertained, ascertains a tuning direction from this phase shift and decreases or increases the frequency according to this tuning direction.

\* \* \* \* \*